United States Patent
Djugash et al.

(10) Patent No.: US 9,591,447 B2
(45) Date of Patent: Mar. 7, 2017

(54) SYSTEMS AND METHODS FOR PROVIDING CONTEXTUAL ENVIRONMENTAL INFORMATION

(71) Applicant: Toyota Motor Engineering & Manufacturing North America, Inc., Erlanger, KY (US)

(72) Inventors: Joseph M. A. Djugash, San Jose, CA (US); Tiffany L. Chen, Santa Clara, CA (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 64 days.

(21) Appl. No.: 14/633,590

(22) Filed: Feb. 27, 2015

(65) Prior Publication Data

US 2016/0255469 A1 Sep. 1, 2016

(51) Int. Cl.
| | |
|---|---|
| *H04W 24/00* | (2009.01) |
| *H04W 4/02* | (2009.01) |
| *G08B 7/06* | (2006.01) |

(52) U.S. Cl.
CPC .............. *H04W 4/023* (2013.01); *G08B 7/06* (2013.01)

(58) Field of Classification Search
CPC ................................. H04W 4/023; G08B 7/06
USPC ........................... 455/456.3, 410, 411, 414.1
See application file for complete search history.

(56) References Cited

U.S. PATENT DOCUMENTS

| | | | |
|---|---|---|---|
| 5,915,238 A | 6/1999 | Tjaden | |
| 6,349,257 B1 | 2/2002 | Liu et al. | |
| 6,401,094 B1 | 6/2002 | Stemp et al. | |
| 6,542,814 B2 | 4/2003 | Polidi et al. | |
| 6,571,279 B1 | 5/2003 | Herz et al. | |
| 8,233,919 B2 | 7/2012 | Haag et al. | |
| 8,326,281 B2 * | 12/2012 | Hill ..................... | H04M 1/7253 455/422.1 |
| 8,386,170 B2 | 2/2013 | James | |
| 8,731,821 B2 | 5/2014 | Sheynblat | |
| 8,788,952 B2 * | 7/2014 | Hamilton, II ........... | A63F 13/10 715/706 |
| 8,810,392 B1 * | 8/2014 | Teller .................... | G08B 21/24 235/385 |

(Continued)

OTHER PUBLICATIONS

International Search Report and Written Opinion dated Apr. 19, 2016 issued in corresponding International Application No. PCT/US2016/016497 filed Feb. 4, 2016.

(Continued)

*Primary Examiner* — Marceau Milord
(74) *Attorney, Agent, or Firm* — Dinsmore & Shohl LLP

(57) ABSTRACT

Systems and methods for providing contextual environmental information. One embodiment of a method includes detecting a plurality of objects in an environment, identifying at least a portion of the plurality of objects in the environment, and determining a location of a user relative to the plurality of objects. Some embodiments may be configured to determine a desired number of alerts to provide the user based on a characteristic of the user and, in response to determining that the desired number of alerts is less than a number of objects detected in the environment, provide data related to a location of a subset of the plurality of objects, relative to the user.

20 Claims, 4 Drawing Sheets

(56) References Cited

U.S. PATENT DOCUMENTS

| | | | | |
|---|---|---|---|---|
| 8,880,100 B2* | 11/2014 | Dobyns | ............... | H04W 4/008 |
| | | | | 455/41.2 |
| 8,942,727 B1* | 1/2015 | Roman | ............... | H04L 67/18 |
| | | | | 455/404.2 |
| 8,948,720 B1* | 2/2015 | Chan | ............... | H04W 4/06 |
| | | | | 340/539.1 |
| 8,965,268 B2* | 2/2015 | Pharn | ............... | H04N 21/814 |
| | | | | 340/539.13 |
| 8,965,986 B1* | 2/2015 | Acharya | ............... | H04M 15/844 |
| | | | | 709/206 |
| 9,101,459 B2* | 8/2015 | Wexler | ............... | G09B 21/006 |
| 9,143,603 B2* | 9/2015 | Davis | ............... | H04M 1/72569 |
| 9,256,347 B2* | 2/2016 | Finn | ............... | A63F 13/10 |
| 2007/0095903 A1 | 5/2007 | Suenbuel | | |
| 2011/0098029 A1* | 4/2011 | Rhoads | ............... | G01C 21/3629 |
| | | | | 455/418 |
| 2011/0130112 A1 | 6/2011 | Saigh et al. | | |
| 2013/0044005 A1 | 2/2013 | Foshee et al. | | |
| 2013/0150117 A1 | 6/2013 | Rodriguez et al. | | |
| 2013/0253818 A1 | 9/2013 | Sanders et al. | | |
| 2015/0134552 A1* | 5/2015 | Engels | ............... | G06Q 30/0185 |
| | | | | 705/318 |

OTHER PUBLICATIONS

"BlindSquare Instructions", http://blindsquare.com/instructions/, Dec. 29, 2014.

Hend K. Gedawy, "Designing an Interface and Path Translator for a Smart Phone-Based Indoor Navigation System for Visually Impaired Users", Thesis, Dec. 2011.

L. Kaminski et al., "Voice Maps—portable, dedicated GIS for supporting the street navigation and self-dependent movement of the blind", IEEE, Information Technology (ICIT), 2nd International Conference, pp. 153-156, Jun. 28-30, 2010, http://ieeexplore.ieee.org/xpl/login.jsp?tp=&arnumber=5553368&url=http%3A%2F%2Fieeexplore.ieee.org%2Fxpls%2Fabs_all.jsp%3Farnumber%3D5553368.

* cited by examiner

SYSTEMS AND METHODS FOR PROVIDING CONTEXTUAL ENVIRONMENTAL INFORMATION

TECHNICAL FIELD

Embodiments described herein generally relate to systems and methods for providing contextual environmental information and, more specifically, to determining and filtering contextual cues, based on environmental conditions.

BACKGROUND

Services now exist that utilize positioning data to determine nearby points of interest. As an example, Yelp™ provides information related to restaurants and/or other establishments that are near a user. Other devices and services provide similar functionality for the visually impaired user. While this functionality may be useful, there are often limitations related to information provided, as well as filtering of notices to the user.

SUMMARY

Systems and methods for providing contextual environmental information are provided. One embodiment of a method includes detecting a plurality of objects in an environment, identifying at least a portion of the plurality of objects in the environment, and determining a location of a user relative to the plurality of objects. Some embodiments may be configured to determine a desired number of alerts to provide the user based on a characteristic of the user and, in response to determining that the desired number of alerts is less than a number of objects detected in the environment, provide data related to a location of a subset of the plurality of objects, relative to the user.

In another embodiment, a system for providing contextual environmental information includes a memory component that stores logic that, when executed by a processor, causes the system to detect a plurality of objects in an environment, identify at least a portion of the plurality of objects in the environment, and determine a location of a user relative to the plurality of objects. In some embodiments, the logic may additionally cause the system to determine a desired number of alerts to provide the user based on a characteristic of the user and, in response to determining that the desired number of alerts is less than a number of objects detected in the environment, provide data related to a location of a subset of the plurality of objects, relative to the user.

In yet another embodiment, a computing device for providing contextual environmental information includes a sensor for detecting an object in an environment, and an output device that is coupled to the sensor, where the output device is configured for outputting contextual environmental information. A memory component may also be included and may store logic that, when executed by the computing device, causes the computing device to utilize the sensor to detect a plurality of objects in the environment, identify at least a portion of the plurality of objects in the environment, and determine a location of a user relative to the plurality of objects. In some embodiments, the logic causes the computing device to determine a desired number of alerts to provide the user based on a characteristic of the user and, in response to determining that the desired number of alerts is less than a number of objects detected in the environment, utilizing the output device to provide data related to a location of a subset of the plurality of objects, relative to the user.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for providing contextual environmental information. Some embodiments may be configured to detect nearby features, signage, and/or points of interest and can utilize a prioritized list of features, signs, and/or points of interest to optimize how and when to announce the presence of various objects in the vicinity of the user. This prioritized list does not simply determine what information is announced to the user, but determines how much of all the available information about a specific item from the list of all available items is nearby the vicinity of the user. Providing the user with an indication of the items in the vicinity of the device may also depend on a determined time to provide the user with the information. If the user is traveling (such as when walking or traveling in a vehicle), only a subset of the items may be provided.

As an example, the following items may be near the user: a restroom, a bench, one or more persons, and a dog. Additionally, the user may have previously specified that the priority of providing data to the user is restroom>persons>bench>dog. Given the time constraints on how long it is ideal for the device to provide audio information regarding the items (e.g., long enough for 3 items), the device might only announce, "there is a restroom to the right, persons to your right, and a dog to your left."

Similarly, some embodiments may be configured to utilize crowd sourcing for determining a priority of alerts, and/or for detecting objects in an environment. As an example, the user computing device may be configured to communicate with one or more other computing devices to determine popular priorities and/or triggering mechanisms for providing alerts. Similarly, the user computing device may communicate with one or more other computing devices when the user computing device does not sense or recognize an object in an environment (and/or to provide a better or different perspective on an object in the environment). Other embodiments may also be provided.

Figure 1:
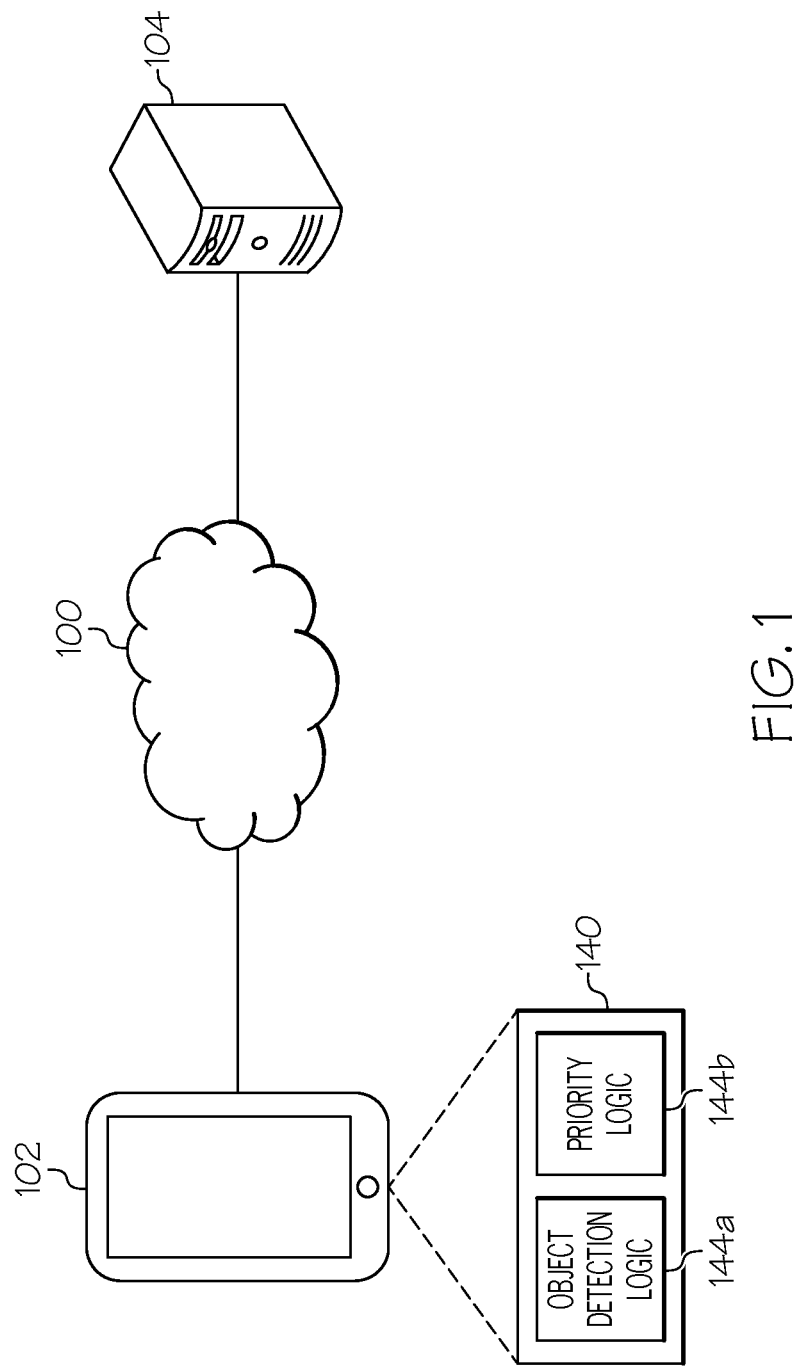
FIG. 1 schematically depicts a computing environment for providing contextual environmental information, according to embodiments disclosed herein.

Referring now to the drawings, FIG. 1 schematically depicts a computing environment for providing contextual environmental information, according to embodiments disclosed herein. As illustrated, the computing environment includes a network 100, a user computing device 102, and a remote computing device 104. The network 100 may include any wide area network, such as the internet, a cellular network, a telephone network, and/or others. In some embodiments, the network 100 includes a local area network, such as may be provided by an Ethernet device, a wireless fidelity (Wi-Fi) device, a near-field communication (NFC) device, a Bluetooth® device, etc. Regardless, the network 100 may facilitate communication between the user computing device 102, the remote computing device 104, and/or other computing devices.

The user computing device 102 may include a mobile device that can determine user's location, speed, route, as well as determine objects in the user's vicinity, along the determined route of the user, and/or at other areas of relevance of the user. Accordingly, the user computing device 102 may include a positioning system receiver (such as a global positioning receiver, Wi-Fi device, etc.), a gyroscope, an image capture device (such as a camera, an infrared sensor, etc.), and/or other hardware and software for detecting objects within an environment. As an example, the user computing device 102 may utilize the positioning system to identify points of interest, such as restrooms, stores, streets, etc., as well as other objects, such as persons, pets, automobiles, bicycles, etc. Similarly, the user computing device 102 may utilize the image capture device, a laser device, a radio frequency identifier (RFID) device, Bluetooth® device, NFC device, a Wi-Fi device, and/or other sensors for detecting objects in the environment. The gyroscope (or similar device) may be utilized to determine an orientation of the user computing device 102 to properly instruct the user of the relative position of the objects in the environment. Also included with the user computing device 102 is at least one output device for providing audio alerts, visual alerts, and/or vibratory alerts to a user (including vision impaired users).

The user computing device 102 also includes a memory component 140, which stores object detection logic 144a and priority logic 144b. The object detection logic 144a may be configured to cause the user computing device 102 to detect objects in an environment. The priority logic 144b may be configured to determine a priority of alerts to be provided.

The remote computing device 104 may communicate with the user computing device 102 to provide at least a portion of the functionality described herein. As an example, priority may be determined by the remote computing device 104, which may be sent to the user computing device 102. In some embodiments, the user computing device 102 may be configured to provide the functionality described above, while the remote computing device 104 provides updates and other administrative communication with the user computing device 102.

Figure 2:
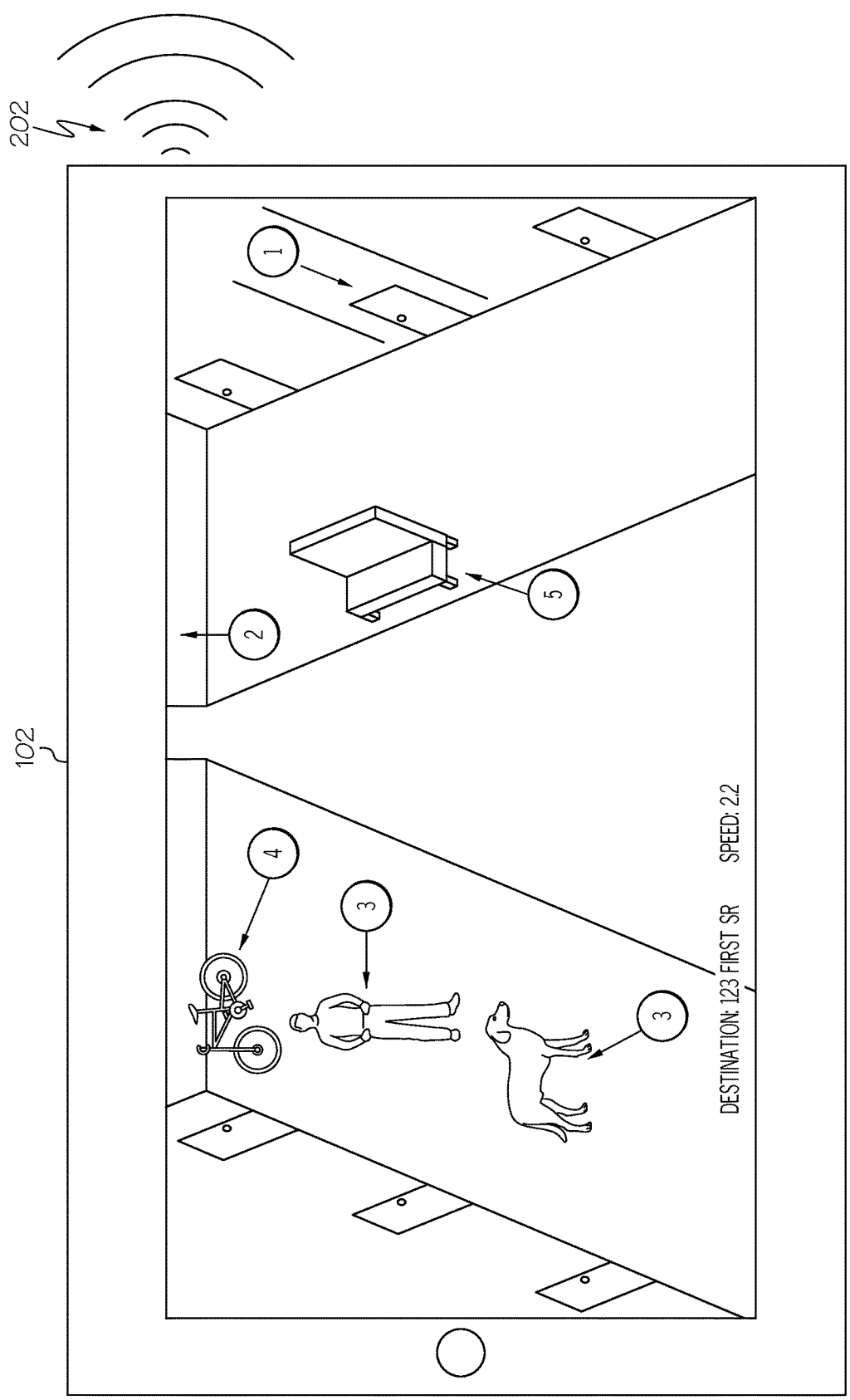
FIG. 2 schematically depicts a computing device that provides location data regarding objects in an environment, according to embodiments disclosed herein.

FIG. 2 schematically depicts a user computing device 102 that provides location data regarding objects in an environment, according to embodiments disclosed herein. In response to determining a location of the user and/or user computing device 102, as well as the location of one or more objects in the environment, the user computing device 102 may determine a priority of alerts, and a number of alerts to provide. The priority may be based on user studies, a user selected priority, crowd sourcing data, and/or based on past user actions. Similarity, the number of alerts to provide may be determined based on a current speed of the user, a determined route of the user, a destination of the user, a mode of transportation, an environment, and/or other criteria. As an example, if the user computing device 102 determines that the user is traveling in a vehicle, certain types of objects may be excluded from the alerts (e.g., park benches). Similarly, due to the speed the user is traveling, the user computing device 102 may provide only enough alerts that are usable by the user. As an example, if the user is traveling 35 miles per hour, the user may not be able to process multiple alerts for a single point in an environment. Accordingly, the user computing device 102 may determine a desired number of alerts for that particular speed and provide that number of alerts, according to the predetermined priority. The alert may be provided as a vibratory alert, an audio alert, and/or a visual alert.

In the embodiment of FIG. 2, the user computing device 102 may identify one or more objects in an environment. The user computing device 102 may determine a priority of alerts, and a number of alerts to provide. Additionally, the user computing device 102 may provide the alerts visually (via a visual display device), via an audio output device 202, and/or via a vibratory output device. Depending on the embodiment, a different number of visual alerts, audio alerts, and vibratory alerts may be provided. Specifically, objects 1-5 are provided visually and prioritized in FIG. 2 as a first alert. In some embodiments, audio alerts may be provided for objects 1-4. Vibratory alerts may be provided for object 5.

It should be understood that, depending on the particular embodiment, the visual alerts, the audio alerts, and/or the vibratory alerts may be omitted. As an example, if the user is vision impaired, the user computing device 102 may or may not include a visual display. Accordingly, visual alerts may be omitted from being provided. Similarly, the user computing device 102 may provide one or more options to configure which alerts are provided to the user, based on conservation of battery life, or other user preferences. In some embodiments, two or more alerts may be provided for an object (e.g., providing visual and audible alerts for pedestrians).

Figure 3:
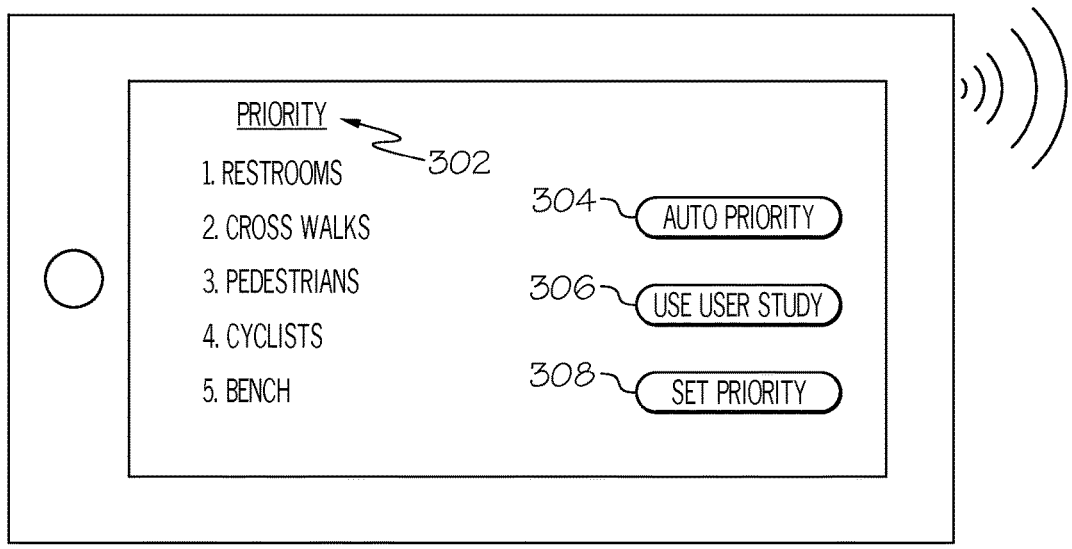
FIG. 3 schematically depicts a computing device for providing priority data for environmental alerts, according to embodiments disclosed herein.

FIG. 3 schematically depicts a user computing device 102 for providing priority data for environmental alerts, according to embodiments disclosed herein. As illustrated, the user computing device 102 may provide a priority list of alerts 302 to provide to the user. Also provided are an auto priority option 304, a user study option 306, and a set priority option 308 for making a priority determination. In response to selection of the auto priority option 304, the priority of alerts may be determined automatically, based on past user actions. A past user action may include any model learned from a past user's actions, not just the actions themselves. For example, if the user computing device 102 determines that user tends to ask for the restroom upon entering a building and then tends to ask for the customer service desk, the user computing device 102 and/or remote computing device 104 can learn this prioritization automatically by taking an average or fitting some other mathematical representation to the user's behavior. Similarly, some embodiments may be configured to prioritize based upon one or more specific past user actions, such as the most recent action, the most utilized action, etc.

In response to selection of the user study option 306, the priority may be determined based on a third party study of an appropriate priority of alerts. In response to selection of the set priority option 308, the user may manually set the priority (according to a user selection). Some embodiments may provide a crowd sourcing option. In response to selection of the crowd sourcing option, the user computing device 102 may determine priority, object detection, and/or object identification functionality, with the assistance of other computing devices, as described above.

It should be understood that, similar to FIG. 3, one or more options may be provided for determining the number of alerts to provide to the user, as well as the triggering mechanisms for providing different numbers of alerts. As an example, the user may determine that a reduced number of alerts should be provided if the user is traveling in a vehicle and/or when present in an office environment. Similarly, options may be provided regarding a particular speed of the user, time of day, location of the user, etc. for triggering the reduced or increased number of alerts to provide.

It should also be understood that some embodiments may provide the user with an option to identify a first priority, which will always be provided and/or will be provided in a most prominent manner. As an example, the user may select that restrooms are the first priority, such that regardless of the environment or other condition (such as speed, etc.), if a restroom is present in the environment, an alert will be provided and/or provided before other alerts. Similarly, some embodiments are configured such that a first priority is determined based on past user actions.

Figure 4:
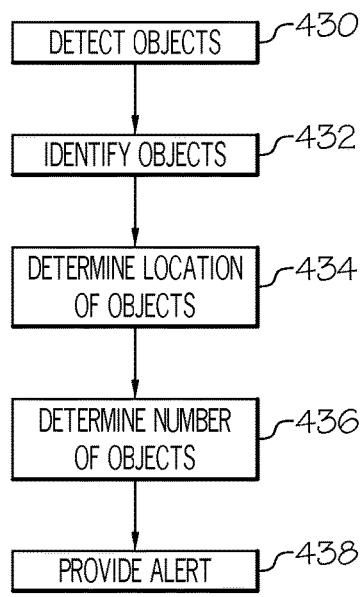
FIG. 4 depicts a flowchart for providing contextual environmental information, according to embodiments disclosed herein.

FIG. 4 depicts a flowchart for providing contextual environmental information, according to embodiments disclosed herein. As illustrated in block 430, a plurality of objects may be detected in an environment. In block 432, at least a portion of the plurality of objects in the environment may be identified. In block 434, a location of a user may be determined, relative to the plurality of objects. In block 436, a desired number of alerts may be determined to provide to the user, based on a characteristic of the user (such as location, speed, user preferences, etc.). In block 438, in response to determining that the desired number of alerts is less than a number of objects detected in the environment, data may be provided related to a location of a subset of the plurality of objects, relative to the user.

Figure 5:
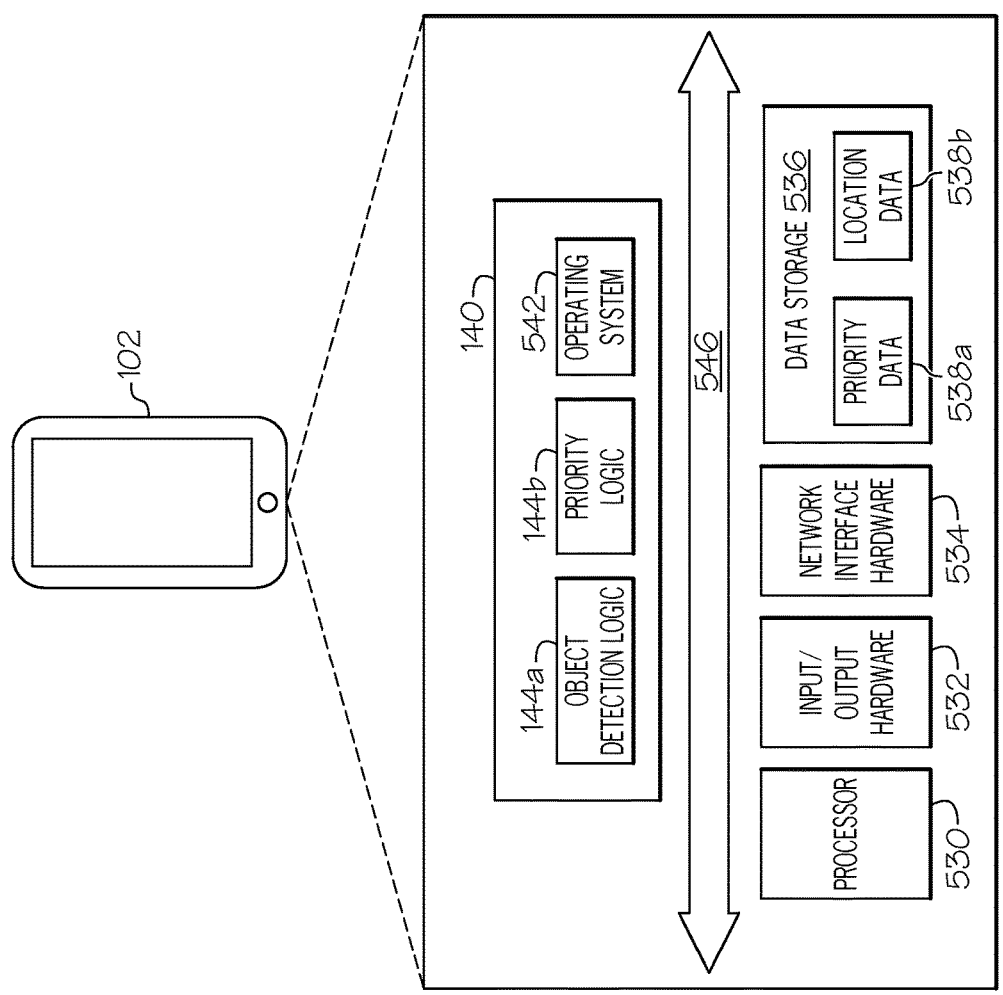
FIG. 5 depicts a computing device for providing contextual environmental information, according to embodiments disclosed herein.

FIG. 5 depicts a user computing device 102 for providing contextual environmental information, according to embodiments disclosed herein. The user computing device 102 includes a processor 530, input/output hardware 532, network interface hardware 534, a data storage component 536 (which stores priority data 538a, location data 536b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the user computing device 102 and/or external to the user computing device 102.

The memory component 140 may store operating system logic 542, the object detection logic 144a and the priority logic 144b. The object detection logic 144a and the priority logic 144b may each include a plurality of different pieces of logic, each of which may be embodied as a computer program, firmware, and/or hardware, as an example. A local interface 546 is also included in FIG. 5 and may be implemented as a bus or other communication interface to facilitate communication among the components of the user computing device 102.

The processor 530 may include any processing component operable to receive and execute instructions (such as from a data storage component 536 and/or the memory component 140). As described above, the input/output hardware 532 may include and/or be configured to interface with the components of FIG. 5.

The network interface hardware 534 may include and/or be configured for communicating with any wired or wireless networking hardware, including an antenna, a modem, a LAN port, wireless fidelity (Wi-Fi) card, WiMax card, mobile communications hardware, and/or other hardware for communicating with other networks and/or devices. From this connection, communication may be facilitated between the user computing device 102 and other computing devices, such as those depicted in FIG. 1.

The operating system logic 542 may include an operating system and/or other software for managing components of the user computing device 102. As discussed above, the object detection logic 144a may reside in the memory component 140 and may be configured to cause the processor 530 to identify an object in an environment, as described above. Similarly, the priority logic 144b may be utilized to determine a priority of alerts, a number of alerts, and/or other data.

It should be understood that while the components in FIG. 5 are illustrated as residing within the user computing device 102, this is merely an example. In some embodiments, one or more of the components may reside external to the user computing device 102. It should also be understood that, while the user computing device 102 is illustrated as a single device, this is also merely an example. In some embodiments, the object detection logic 144a and the priority logic 144b may reside on different computing devices. As an example, one or more of the functionalities and/or components described herein may be provided by the user computing device 102, the remote computing device 104 and/or other computing devices, which may be coupled to the user computing device 102 via the network 100. These computing devices may also include hardware and/or software for performing the functionality described herein.

Additionally, while the user computing device 102 is illustrated with the object detection logic 144a and the priority logic 144b as separate logical components, this is also an example. In some embodiments, a single piece of logic may cause the remote computing device 104 to provide the described functionality.

As illustrated above, various embodiments for providing contextual environmental information are disclosed. Accordingly, these embodiments provide the user with a desired number of alerts, based on the location, speed, type of transportation, etc. Thus, the user is only provided according to the circumstance the user is currently engaged.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for providing contextual environmental information. It should also be understood that these embodiments are merely exemplary and are not intended to limit the scope of this disclosure.

What is claimed is:

1. A method for providing contextual environmental information comprising:
   detecting a plurality of objects in an environment;
   identifying at least a portion of the plurality of objects in the environment;
   determining a location of a user relative to the plurality of objects;
   determining a desired number of alerts to provide the user based on a characteristic of the user; and
   in response to determining that the desired number of alerts is less than a number of objects detected in the environment, providing data related to a location of a subset of the plurality of objects, relative to the user.

2. The method of claim 1, wherein detecting the plurality of objects includes utilizing at least one of the following: a positioning system receiver, a near field communication device, a Bluetooth® device, a laser device, a radio frequency (RF) device, and a wireless fidelity (Wi-Fi) device.

3. The method of claim 1, wherein providing data related to a location of the subset of the plurality of objects includes providing at least one of the following: an audio alert, a visual alert, and a vibratory alert.

4. The method of claim 1, further comprising providing an option for determining a priority of the alerts that are provided to the user.

5. The method of claim 1, further comprising providing an option for determining the desired number of alerts to provide to the user.

6. The method of claim 1, wherein a priority of the alerts is determined based on at least one of the following: a user selection, a user study, crowd sourcing, and a past user action.

7. The method of claim 1, wherein the desired number of alerts is determined based on at least one of the following: a user selection, a user study, crowd sourcing, and a past user action.

8. A system for using a providing contextual environmental information comprising:
   a memory component that stores logic that, when executed by a processor, causes the system to perform at least the following:
   detect a plurality of objects in an environment;
   identify at least a portion of the plurality of objects in the environment;
   determine a location of a user relative to the plurality of objects;
   determine a desired number of alerts to provide the user based on a characteristic of the user;
   determine a priority to provide the desired number of alerts; and
   in response to determining that the desired number of alerts is less than a number of objects detected in the environment, provide data related to a location of a subset of the plurality of objects according to the priority.

9. The system of claim 8, wherein detecting the plurality of objects includes utilizing at least one of the following: a positioning system receiver, a near field communication device, a Bluetooth® device, a laser device, a radio frequency (RF) device, and a wireless fidelity (Wi-Fi) device.

10. The system of claim 9, wherein providing data related to a location of the subset of the plurality of objects includes providing at least one of the following: an audio alert, a visual alert, and a vibratory alert.

11. The system of claim 8, wherein the logic further causes the system to provide an option for determining the priority of alerts that are provided to the user.

12. The system of claim 8, wherein the logic further causes the system to provide an option for determining the desired number of alerts to provide to the user.

13. The system of claim 8, wherein the priority is determined based on at least one of the following: a user selection, a user study, crowd sourcing, and a past user action.

14. The system of claim 8, wherein the logic further causes the system to communicate with at least one user computing device to determine at least one of the following: the priority, an identification of at least one of the plurality of objects in the environment, and a recognition of at least one of the plurality of objects in the environment.

15. A computing device for providing contextual environmental information comprising:
   a sensor for detecting an object in an environment;
   an output device that is coupled to the sensor, the output device for outputting contextual environmental information; and
   a memory component that stores logic that, when executed by the computing device, causes the computing device to perform at least the following:
   utilize the sensor to detect a plurality of objects in the environment;
   identify at least a portion of the plurality of objects in the environment;
   determine a location of a user relative to the plurality of objects;
   determine a desired number of alerts to provide the user based on a characteristic of the user; and
   in response to determining that the desired number of alerts is less than a number of objects detected in the environment, utilizing the output device to provide data related to a location of a subset of the plurality of objects, relative to the user and according to a predetermined priority.

16. The computing device of claim 15, wherein detecting the plurality of objects includes utilizing at least one of the following: a positioning system receiver, a near field communication device, a Bluetooth® device, a laser device a radio frequency (RF) device, and a wireless fidelity (Wi-Fi) device.

17. The computing device of claim 15, wherein the logic further causes the computing device to provide an option for determining the predetermined priority.

18. The computing device of claim 15, wherein the output device comprises at least one of the following: an audio output device, a visual display device, and a vibratory output device.

19. The computing device of claim 15, wherein the logic further causes the computing device to provide an option for determining the desired number of alerts to provide to the user.

20. The computing device of claim 15, wherein the predetermined priority is determined based on at least one of the following: a user selection, a user study, and a past user action.

* * * * *